US010053086B2

(12) United States Patent
Oba et al.

(10) Patent No.: US 10,053,086 B2
(45) Date of Patent: Aug. 21, 2018

(54) HYBRID VEHICLE

(71) Applicant: TOYOTA JIDOSHA KABUSHIKI KAISHA, Toyota-shi, Aichi-ken (JP)

(72) Inventors: Tomoko Oba, Nagoya (JP); Shohei Oi, Toyota (JP); Atsushi Nomura, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 139 days.

(21) Appl. No.: 15/297,506

(22) Filed: Oct. 19, 2016

(65) Prior Publication Data
US 2017/0113678 A1 Apr. 27, 2017

(30) Foreign Application Priority Data

Oct. 21, 2015 (JP) ................................ 2015-207314

(51) Int. Cl.
*B60K 6/26* (2007.10)
*B60W 20/50* (2016.01)
(Continued)

(52) U.S. Cl.
CPC ............... *B60W 20/50* (2013.01); *B60K 6/26* (2013.01); *B60K 6/28* (2013.01); *B60K 6/445* (2013.01); *B60W 10/06* (2013.01); *B60W 10/08* (2013.01); *B60K 6/365* (2013.01); *B60L 3/003* (2013.01); *B60W 2510/0638* (2013.01); *B60W 2510/242* (2013.01); *B60W 2710/0644* (2013.01);
(Continued)

(58) Field of Classification Search
CPC .. B60K 6/28; B60K 6/26; B60K 6/445; B60L 3/003; B60Y 2200/92; B60Y 2400/61; B60W 10/06; B60W 10/08; B60W 20/50; B60W 2510/0638; B60W 2710/0644; B60W 2710/0677
USPC ....... 701/22, 53, 54, 63, 84; 180/338, 65.21, 180/65.28, 65.275, 65.285
See application file for complete search history.

(56) References Cited

U.S. PATENT DOCUMENTS 8,884,577 B2 * 11/2014 Tsuji ....................... H02M 1/32
 318/400.21
8,975,857 B2 * 3/2015 Kawamura ........... H02P 27/085
 318/801
(Continued)

FOREIGN PATENT DOCUMENTS

JP 2009-278791 11/2009

*Primary Examiner* — Dalena Tran
(74) *Attorney, Agent, or Firm* — Finnegan, Henderson, Farabow, Garrett & Dunner, LLP (57) ABSTRACT

A hybrid vehicle includes an engine, a first rotating electrical machine (first MG), a second rotating electrical machine (second MG), a planetary gear mechanism which mechanically couples these devices, a first inverter which drives the first MG, a second inverter which drives the second MG, and a controller. When the controller receives a fail signal from the first inverter, the controller performs shut-down control which brings the first inverter into a gate shut-down state with fuel supply to the engine being stopped. When the absolute value of an engine rotation speed Ne is more than or equal to a predetermined value α and the absolute value of a rotation speed Nm1 of the first MG is less than a threshold value β after the shut-down control is started, the controller determines that the first inverter has a short-circuit fault.

3 Claims, 9 Drawing Sheets

(51) Int. Cl.
*B60K 6/28* (2007.10)
*B60K 6/445* (2007.10)
*B60W 10/06* (2006.01)
*B60W 10/08* (2006.01)
B60K 6/365 (2007.10)
B60L 3/00 (2006.01)

(52) U.S. Cl.
CPC . *B60W 2710/0677* (2013.01); *B60W 2710/08* (2013.01); *B60W 2710/086* (2013.01); *B60W 2710/248* (2013.01); *B60Y 2200/92* (2013.01); *B60Y 2300/192* (2013.01); *B60Y 2400/61* (2013.01); *Y02T 10/6239* (2013.01); *Y02T 10/6286* (2013.01); *Y02T 10/7258* (2013.01); *Y10S 903/906* (2013.01); *Y10S 903/907* (2013.01); *Y10S 903/91* (2013.01); *Y10S 903/93* (2013.01)

(56) References Cited

U.S. PATENT DOCUMENTS

2005/0174076 A1* 8/2005 Katanaya .......... H02M 7/53873
318/400.28
2009/0284198 A1 11/2009 Shimana et al.

* cited by examiner

HYBRID VEHICLE

This nonprovisional application is based on Japanese Patent Application No. 2015-207314 filed on Oct. 21, 2015 with the Japan Patent Office, the entire contents of which are hereby incorporated by reference.

BACKGROUND OF THE INVENTION

Field of the Invention

The present invention relates to a hybrid vehicle capable of running using motive power of at least one of an engine and a rotating electrical machine.

Description of the Background Art

Japanese Patent Laying-Open No. 2009-278791 discloses a technique for determining, in a case where an abnormality of an inverter which drives a motor is detected, whether or not the abnormality is a short-circuit fault of a switching element included in the inverter. Specifically, in the case where an abnormality of the inverter is detected, if the current value of each phase is higher than a predetermined value with all switching elements included in the inverter being in a gate shut-down state, it is considered that a circulating current (short-circuit current) due to a counter-electromotive voltage of the motor is flowing through a switching element having a short-circuit fault, and thus it is determined that there is a switching element having a short-circuit fault.

SUMMARY OF THE INVENTION

In order to determine whether or not a switching element of an inverter has a short-circuit fault using a circulating current due to a counter-electromotive voltage of a motor as in the determination technique disclosed in Japanese Patent Laying-Open No. 2009-278791, the circulating current desirably has a high value to some extent.

However, when the circulating current due to the counter-electromotive voltage of the motor flows, the motor generates a braking torque (drag torque) acting in a direction which prevents rotation of the motor. If the absolute value of a rotation speed of the motor stagnates near 0 (a value less than a threshold value) due to this braking torque, the circulating current due to the counter-electromotive voltage becomes very low. Accordingly, there is a possibility that the technique using the circulating current may fail to accurately determine whether or not a switching element of the inverter has a short-circuit fault.

The present invention has been made to solve the aforementioned problem, and an object of the present invention is to able to determine whether or not a switching element of an inverter has a short-circuit fault even when the absolute value of a rotation speed of a rotating electrical machine stagnates near 0 (less than a threshold value) and a circulating current due to a counter-electromotive voltage hardly flows.

A hybrid vehicle in accordance with the present invention includes an engine; a first rotating electrical machine having a rotor provided with a permanent magnet; an output shaft connected to drive wheels; a planetary gear mechanism configured to mechanically couple the engine, the first rotating electrical machine, and the output shaft; a second rotating electrical machine connected to the output shaft; a power supply; a first inverter having a plurality of switching elements, the first inverter being configured to convert electric power between the power supply and the first rotating electrical machine; a second inverter configured to convert electric power between the power supply and the second rotating electrical machine; and a controller configured to control the engine, the first inverter, and the second inverter. When the controller receives from the first inverter a fail signal indicating that the first inverter is abnormal, the controller is configured to perform shut-down control which brings the first inverter into a gate shut-down state with fuel supply to the engine being stopped. When an absolute value of a rotation speed of the engine is more than or equal to a predetermined value and an absolute value of a rotation speed of the first rotating electrical machine is less than a threshold value after the shut-down control is started, the controller is configured to determine that a short-circuit fault occurs in any of the plurality of switching elements. When the absolute value of the rotation speed of the engine is less than the predetermined value or the absolute value of the rotation speed of the first rotating electrical machine is more than or equal to the threshold value after the shut-down control is started, the controller is configured to determine that no short-circuit fault occurs in the plurality of switching elements.

According to the above configuration, when the controller receives the fail signal from the first inverter, the controller determines whether or not the first inverter has a short-circuit fault using the absolute value of the rotation speed of the engine and the absolute value of the rotation speed of the first rotating electrical machine after the shut-down control is started, instead of using a circulating current due to a counter-electromotive voltage of the first rotating electrical machine. Therefore, even when the absolute value of the rotation speed of the first rotating electrical machine stagnates near 0 (less than the threshold value) due to a drag torque resulting from the counter-electromotive voltage and the circulating current due to the counter-electromotive voltage hardly flows, it can be determined whether or not a switching element of the first inverter has a short-circuit fault.

Preferably, the plurality of switching elements are electrically connected between the power supply and the first rotating electrical machine to constitute drive arms of three phases each having an upper arm and a lower arm. The controller is configured to perform (i) first fail-safe running control when the controller determines that the short-circuit fault occurs, and (ii) second fail-safe running control when the controller determines that no short-circuit fault occurs. The first fail-safe running control is control which causes the hybrid vehicle to run using motive power of the second rotating electrical machine without using motive power of the engine. The second fail-safe running control is control which causes the engine to crank by performing three-phase ON control that brings the upper arms or the lower arms of the three phases of the first inverter into a conductive state, causes the engine to start by cranking, and thereafter brings the first inverter into the gate shut-down state and causes the hybrid vehicle to run using the motive power of the engine and the motive power of the second rotating electrical machine.

According to the above configuration, when it is determined that no short-circuit fault occurs in the plurality of switching elements of the first inverter, the engine is started in association with cranking by the three-phase ON control of the first inverter, and the second fail-safe running control using the motive power of the engine is performed. Therefore, when compared with a case where the first fail-safe running control that does not use the motive power of the engine is performed uniformly regardless of whether or not a short-circuit failure occurs, fail-safe running using fuel of the engine can be performed. As a result, a fail-safe running distance can be increased.

Preferably, the first inverter is configured to output the fail signal to the controller in such a manner that whether at least one of the upper arms of the three phases or at least one of the lower arms of the three phases is abnormal can be identified. When the controller performs the three-phase ON control, the controller is configured to bring arms without abnormality, of the upper arms and the lower arms, into the conductive state.

The three-phase ON control is performed when it is determined that no short-circuit fault occurs. On this occasion, there remains a possibility that an open fault (a fault in which a switching element is always in a non-conductive state) occurs. Since the three-phase ON control is control that brings the upper arms or the lower arms of the three phases into a conductive state, if an open fault occurs in an arm on a side on which the three-phase ON control is performed, there is a possibility that the three-phase ON control may not function normally, and the engine cannot be cranked. In view of this, in the above configuration, the three-phase ON control is performed on arms on the side in which no abnormality occurs, of the upper arms and the lower arms. Therefore, the engine can be reliably cranked by the three-phase ON control and started.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, an embodiment of the present invention will be described in detail with reference to the drawings. It should be noted that identical or corresponding parts in the drawings are designated by the same reference numerals, and the description thereof will not be repeated.

<Overall Configuration of Vehicle>

Figure 1:
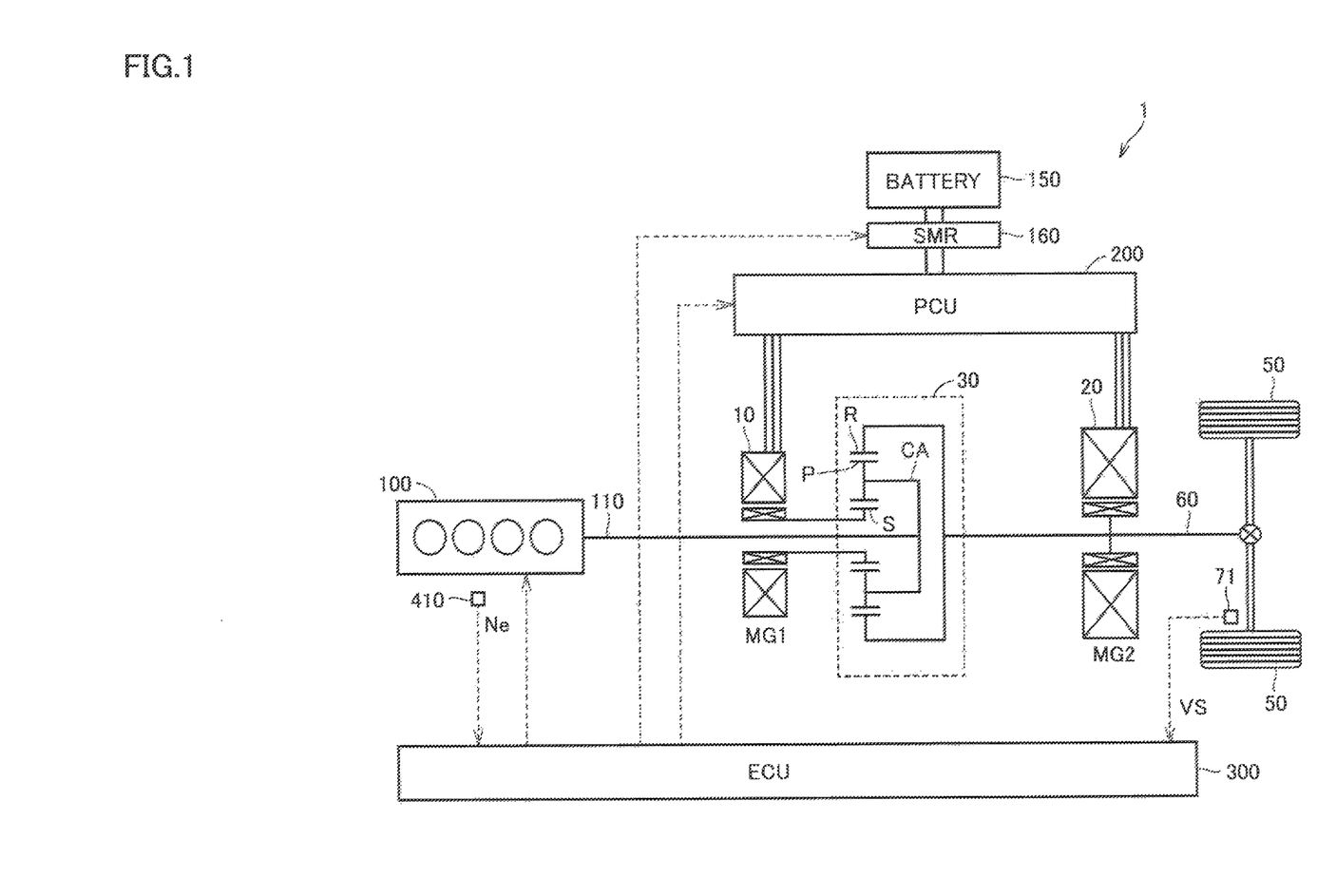
FIG. 1 is a block diagram schematically showing an overall configuration of a vehicle.

FIG. 1 is a block diagram schematically showing an overall configuration of a vehicle 1 in accordance with the present embodiment. Vehicle 1 includes an engine 100, a motor generator (a first rotating electrical machine, hereinafter also referred to as an "MG1" or a "first MG") 10, a motor generator (a second rotating electrical machine, hereinafter also referred to as an "MG2" or a "second MG") 20, a planetary gear mechanism 30, drive wheels 50, an output shaft 60 connected to drive wheels 50, a vehicle speed sensor 71, a battery 150, a system main relay (SMR) 160, a power control unit (ECU) 200, and an electronic control unit (ECU) 300.

Vehicle 1 is a hybrid vehicle which runs using motive power of at least one of engine 100 and motor generator 20. During normal running described later, vehicle 1 can switch the running mode between electric vehicle running (hereinafter referred to as "EV running") in which vehicle 1 runs using motive power of motor generator 20 without using motive power of engine 100, and hybrid vehicle running (hereinafter referred to as "HV running") in which vehicle 1 runs using both the motive power of engine 100 and the motive power of motor generator 20.

Engine 100 is an internal combustion engine such as a gasoline engine or a diesel engine. In response to a control signal from ECU 300, engine 100 generates motive power for vehicle 1 to run. The motive power generated by engine 100 is output to planetary gear mechanism 30.

Engine 100 is provided with an engine rotation speed sensor 410. Engine rotation speed sensor 410 detects a rotation speed (engine rotation speed) Ne of engine 100, and outputs a signal indicating the detection result to ECU 300.

Each of motor generators 10 and 20 is a three-phase alternating-current (AC) permanent magnet synchronous motor. A rotor of each of motor generators 10 and 20 is provided with a permanent magnet. When there is a request to start engine 100, motor generator 10 can generate a torque for performing cranking of engine 100, using electric power of battery 150. It should be noted that vehicle 1 is not provided with a starter which generates a torque for cranking engine 100 using electric power of an auxiliary battery (not shown).

Motor generator 10 can also generate electric power using the motive power of engine 100. AC power generated by motor generator 10 is converted into direct current (DC) power by PCU 200 and is charged in battery 150. The AC power generated by motor generator 10 may also be supplied to motor generator 20.

The rotor of motor generator 20 is coupled to output shaft 60. Motor generator 20 rotates output shaft 60 using electric power supplied from at least one of battery 150 and motor generator 10. Motor generator 20 can also generate electric power by regenerative braking. AC power generated by motor generator 20 is converted into DC power by PCU 200 and is charged in battery 150.

Planetary gear mechanism 30 is configured to mechanically couple engine 100, motor generator 10, and output shaft 60, and to transmit a torque among engine 100, motor generator 10, and output shaft 60. Specifically, planetary gear mechanism 30 includes, as rotating elements, a sun gear S coupled to the rotor of motor generator 10, a ring gear R coupled to output shaft 60, a carrier CA coupled to a crankshaft 110 of engine 100, and a pinion gear P meshing with sun gear S and ring gear R. Carrier CA holds pinion gear P such that pinion gear P can rotate and revolve.

Since planetary gear mechanism 30 is configured as described above, a rotation speed of sun gear S (=an MG1 rotation speed Nm1), a rotation speed of carrier CA (=engine rotation speed Ne), and a rotation speed of ring gear R (=an MG2 rotation speed Nm2) have such a relation that they are connected by a straight line on a nomographic chart (such a relation that when any two of the rotation speeds are determined, the rest is also determined).

Battery 150 is a lithium ion secondary battery configured to be rechargeable. It should be noted that battery 150 may be another secondary battery such as a nickel hydrogen secondary battery.

SMR 160 is connected in series to power lines between battery 150 and PCU 200. SMR 160 switches between a conductive state and a shut-down state between battery 150 and PCU 200 in response to a control signal from ECU 300.

PCU 200 boosts a DC voltage input from battery 150, converts the boosted voltage into an AC voltage, and supplies the AC voltage to motor generator 10 and motor generator 20. PCU 200 also converts the AC power generated by motor generator 10 and motor generator 20 into DC power, and supplies the DC power to battery 150. The configuration of PCU 200 will be described, in detail with reference to FIG. 2.

Vehicle speed sensor 71 detects a rotation speed of drive wheels 50 as a speed (vehicle speed) VS of vehicle 1, and outputs a signal indicating a detection result to ECU 300.

ECU 300 is configured to include a CPU (central processing unit), a memory, an input/output buffer, and the like, although not shown. Based on signals from the sensors and devices, as well as maps and programs stored in the memory, ECU 300 controls an output of engine 100 (such as fuel injection, ignition timing, valve timing, and the like) and outputs of motor generators 10 and 20 (conduction amounts) such that vehicle 1 runs in a desired running state. It should be noted that various controls can be processed not only by software but also by dedicated hardware (electronic circuitry).

When there is a request to start engine 100 while engine 100 is stopped (while fuel supply is stopped), ECU 300 controls PCU 200 (more specifically, a first inverter 221 described later) such that motor generator 10 generates the torque for cranking engine 100. Then, when engine rotation speed Ne reaches a predetermined value by cranking, ECU 300 starts fuel injection control and ignition control of engine 100. Thereby, engine 100 is started.

<Configuration of Electrical System and ECU>

Figure 2:
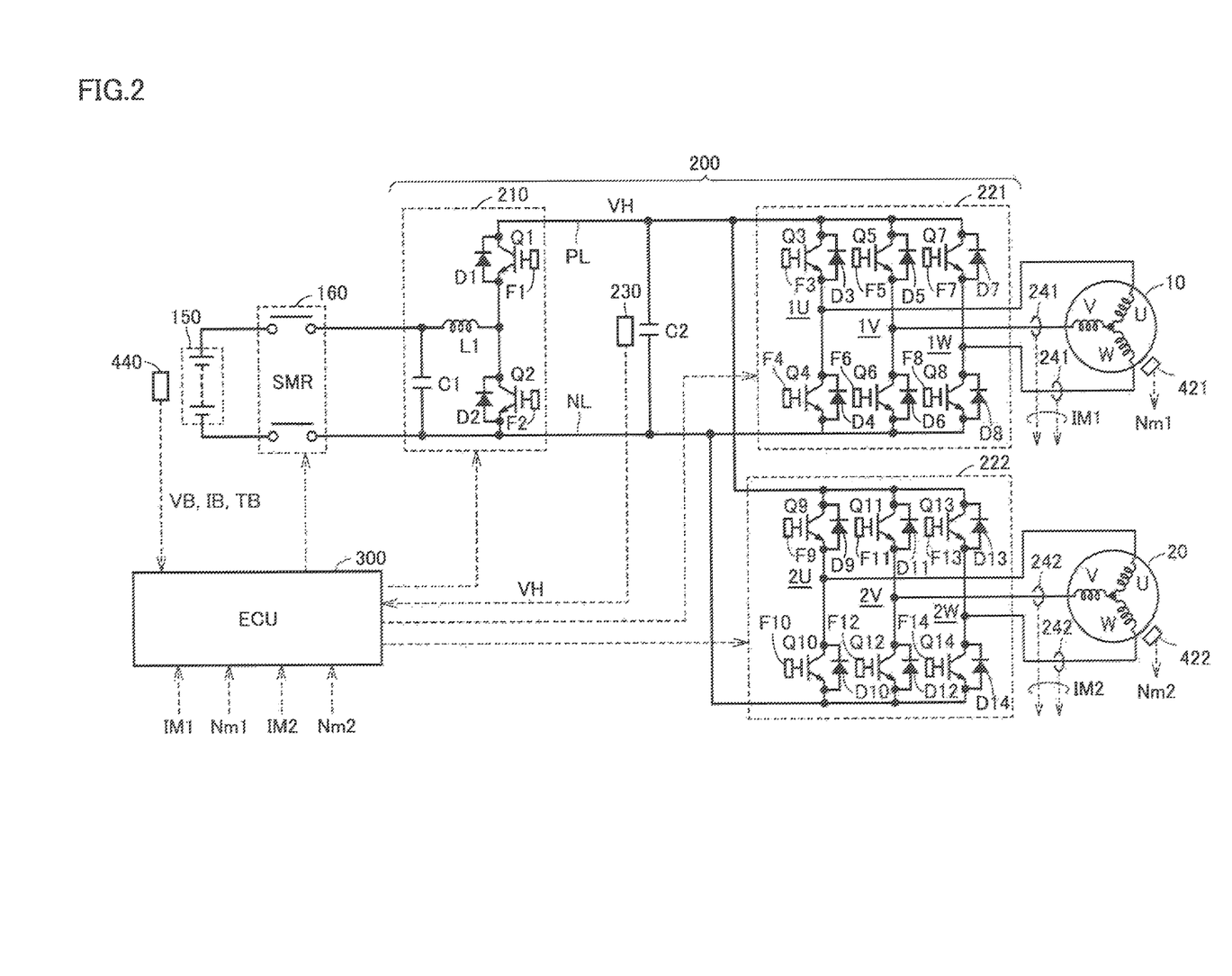
FIG. 2 is a circuit block diagram for illustrating a configuration of an electrical system of the vehicle.

FIG. 2 is a circuit block diagram for illustrating a configuration of an electrical system of vehicle 1. The electrical system of vehicle 1 includes battery 150, PCU 200, motor generators 10 and 20, and ECU 300. PCU 200 includes a converter 210, a capacitor C2, inverters 221 and 222, and a voltage sensor 230. Battery 150 and converter 210 constitute a power supply.

Battery 150 is provided with a monitoring unit 440. Monitoring unit 440 detects a voltage (battery voltage) VB of battery 150, a current (battery current) IB flowing through battery 150, and a temperature (battery temperature) TB of battery 150, respectively, and outputs signals indicating the respective detection results to ECU 300.

Converter 210 includes a capacitor C1, a reactor L1, a switching element Q1 (an upper arm) and a switching element Q2 (a lower arm), and diodes D1 and D2. Capacitor C1 smoothes battery voltage VB and supplies the voltage to converter 210. Each of switching elements Q1 and Q2 and switching elements Q3 to Q14 described later is, for example, an IGBT (Insulated Gate Bipolar Transistor). Switching elements Q1 and Q2 are connected in series with each other between a power line PL and a power line NL.

Diode D1 is connected between a collector and an emitter of switching element Q1 in anti-parallel thereto, and diode D2 is connected between a collector and an emitter of switching element Q2 in anti-parallel thereto. Reactor L1 has one end connected to a high-potential side of battery 150. Reactor L1 has the other end connected to a midpoint between the upper arm and the lower arm (a connection point between the emitter of switching element Q1 and the collector of switching element Q2).

By a switching operation between the upper arm and the lower arm in response to a control signal from ECU 300, converter 210 boosts battery voltage VB input from battery 150, and outputs the voltage to power lines PL and NL. Further, by a switching operation between the upper arm and the lower arm in response to a control signal from ECU 300, converter 210 steps down a DC voltage between power lines PL and NL supplied from one or both of inverters 221 and 222, and outputs the voltage to battery 150.

Capacitor C2 is connected between power line PL and power line NL. Capacitor C2 smoothes a DC voltage supplied from converter 210, and supplies the voltage to inverters 221 and 222.

Voltage sensor 230 detects a voltage across capacitor C2, that is, an output voltage (hereinafter also referred to as a "system voltage") VH of converter 210, and outputs a signal indicating the detection result to ECU 300.

When system voltage VH is supplied, inverter 221 (hereinafter also referred to as "first inverter 221") converts the DC voltage into an AC voltage and drives motor generator 10 in response to a control signal from ECU 300. Inverter 221 includes six switching elements Q3 to Q8, and diodes D3 to D8 connected between collectors and emitters of switching elements Q3 to Q8, respectively, in anti-parallel thereto.

Six switching elements Q3 to Q8 are electrically connected between converter 210 (power supply) and motor generator 10 to constitute drive arms of three phases each having an upper arm and a lower arm. Specifically, inverter 221 includes drive arms of three phases, that is, a U-phase arm 1U, a V-phase arm 1V, and a W-phase arm 1W. Phase arms 1U, 1V, and 1W are connected in parallel with each other between power line PL and power line NL. U-phase arm 1U has switching element Q3 (upper arm) and switching element Q4 (lower arm) connected in series with each other. V-phase arm 1V has switching element Q5 (upper arm) and switching element Q6 (lower arm) connected in series with each other. W-phase arm 1W has switching element Q7 (upper arm) and switching element Q8 (lower arm) connected in series with each other.

Inverter 222 (hereinafter also referred to as "second inverter 222") includes phase arms 2U to 2W, switching elements Q9 to Q14, and diodes D9 to D14. Since the configuration of second inverter 222 is basically equal to that of first inverter 221, the description thereof will not be repeated.

Drive circuits F1 to F14 are connected to switching elements Q1 to Q14, respectively. Each of drive circuits F1 to F14 outputs a drive signal in response to the control signal from ECU 300, to a corresponding switching element. Thereby, each of switching elements Q1 to Q14 is controlled into a state in response to the control signal from ECU 300.

Further, when an abnormality occurs in the corresponding switching element, each of drive circuits F1 to F14 outputs to ECU 300 a fail signal indicating that the corresponding switching element is abnormal. It should be noted that abnormalities of a switching element include a short-circuit fault of the switching element (a fault in which the switching element is always in a conductive state), and abnormalities other than the short-circuit fault (for example, an open fault (a fault in which the switching element is always in a non-conductive state), overcurrent, overvoltage, overheating, and the like).

Figure 3:
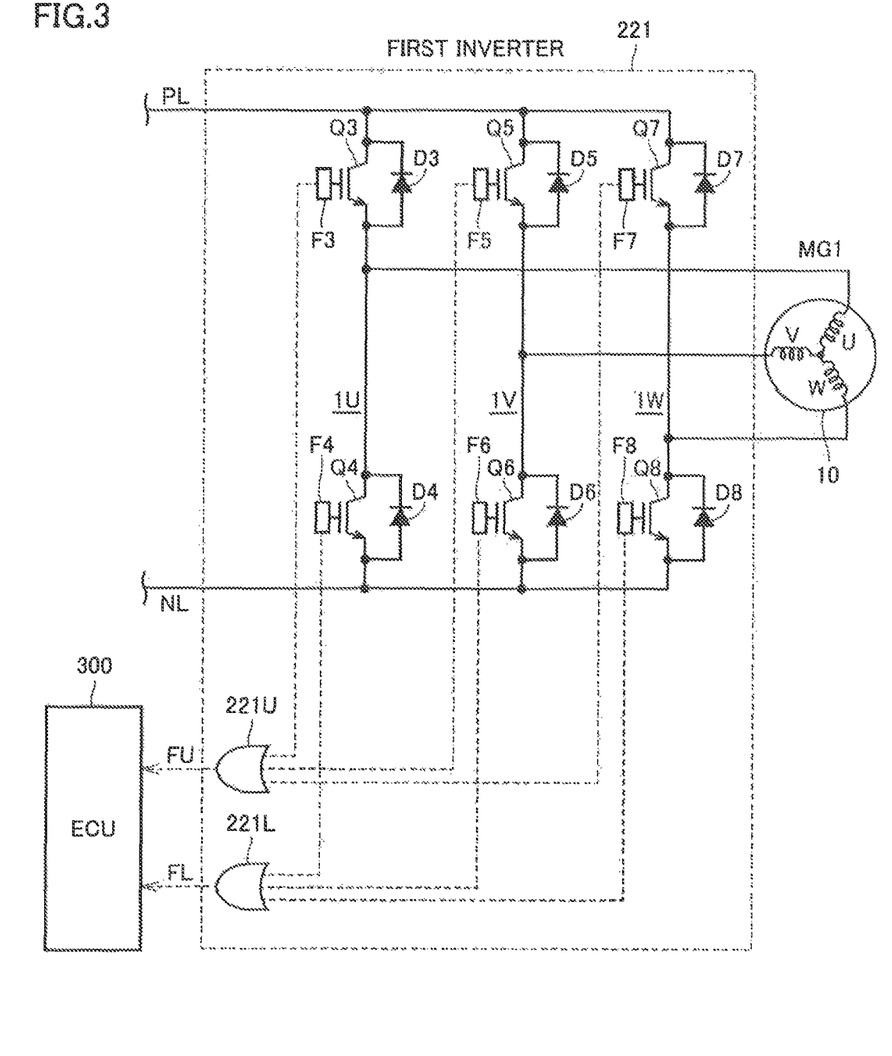
FIG. 3 is a view schematically showing a configuration for outputting a fail signal in a first inverter 221.

FIG. 3 is a view schematically showing a configuration for outputting a fail signal in first inverter 221. First inverter 221 includes OR (logical addition) circuits 221U and 221L. Since second inverter 222 also has the same configuration as that of first inverter 221, the detailed description of the configuration of the second inverter will not be repeated.

OR circuit 221U is connected to drive circuit F3 corresponding to upper arm Q3 of the U phase of inverter 221, drive circuit F5 corresponding to upper arm Q5 of the V phase thereof, and drive circuit F7 corresponding to upper arm Q7 of the W phase thereof. When OR circuit 221U receives a fail signal from at least one of drive circuits F3, F5, and F7, OR circuit 221U outputs to ECU 300 an upper fail signal FU indicating that at least one of upper arms Q3, Q5, and Q7 is abnormal.

OR circuit 221L is connected to drive circuit F4 corresponding to lower arm Q4 of the U phase of inverter 221, drive circuit F6 corresponding to lower arm Q6 of the V phase thereof, and drive circuit F8 corresponding to lower arm Q8 of the W phase thereof. When OR circuit 221L receives a fail signal from at least one of drive circuits F4, F6, and F8, OR circuit 221L outputs to ECU 300 a lower fail signal FL indicating that at least one of lower arms Q4, Q6, and Q8 is abnormal.

Thus, first inverter 221 in accordance with the present embodiment outputs a fail signal to ECU 300 in such a manner that which of the upper arm side and the lower arm side has an abnormality can be identified. Specifically, first inverter 221 outputs different fail signals to ECU 300 when an upper arm is abnormal and when a lower arm is abnormal. When ECU 300 receives upper fail signal FU from first inverter 221, ECU 300 can determine that an upper arm is abnormal, and when ECU 300 receives lower fail signal FL from first inverter 221, ECU 300 can determine that a lower arm is abnormal.

It should be noted that the configuration shown in FIG. 3 is merely exemplary, and a configuration other than the configuration shown in FIG. 3 may be adopted as long as it can output a fail signal in such a manner that which of the upper arm side and the lower arm side has an abnormality can be identified. For example, fail signals from drive circuits F3 to F8 may be directly input to ECU 300 respectively separately. Also with such a configuration, when ECU 300 receives a fail signal from at least one of drive circuits F3, F5, and F7, ECU 300 can determine that an upper arm is abnormal, and when ECU 300 receives a fail signal from at least one of drive circuits F4, F6, and F8, ECU 300 can determine that a lower arm is abnormal.

Referring back to FIG. 2, motor generator 10 is provided with a resolver 421 and current sensors 241. Motor generator 20 is provided with a resolver 422 and current sensors 242. Resolver 421 detects a rotation speed of motor generator 10 (MG1 rotation speed Nm1). Resolver 422 detects a rotation speed of motor generator 20 (MG2 rotation speed Nm2). Current sensors 241 detect phase currents (motor currents) IM1 flowing through motor generator 10. Current sensors 242 detect phase currents (motor currents) IM2 flowing through motor generator 20. These sensors respectively output signals indicating detection results to ECU 300.

Based on information from the sensors and the like, ECU 300 controls PCU 200 (converter 210 and inverters 221, 222) such that outputs of motor generators 10 and 20 achieve desired outputs. It should be noted that, although ECU 300 is configured as one unit in the example shown in FIG. 2, ECU 300 may be divided into a plurality of units.

<Normal Running and Fail-Safe Running>

ECU 300 can cause vehicle 1 to run in a normal mode. The normal mode is a mode in which vehicle 1 is caused to run while switching between the EV running and the HV running described above, as necessary. Hereinafter, running in the normal mode is described as "normal running".

When an abnormality occurs in first inverter 221 which drives the first MG, that is, when ECU 300 receives upper fail signal FU or lower fail signal FL from first inverter 221, ECU 300 causes vehicle 1 to run in a fail-safe mode. The fail-safe mode is a mode in which vehicle 1 is caused to run using the motive power of the second MG while bringing all switching elements Q3 to Q8 of first inverter 221 into a gate shut-down state (non-conductive state). Hereinafter, running in the fail-safe mode is described as "fail-safe running".

It should be noted that, in the present embodiment, the fail-safe running includes "MD (Motor Drive) running" and "MDE (Motor Drive plus Engine) running". In the MD running, vehicle 1 is caused to run in the fail-safe mode using the motive power of the second MG, by stopping fuel supply to engine 100 while bringing first inverter 221 into a gate shut-down state. In the MDE running, vehicle 1 is caused to run in the fail-safe mode using the motive power of engine 100 and the motive power of the second MG, by operating engine 100 while bringing first inverter 221 into a gate shut-down state.

Figure 4:
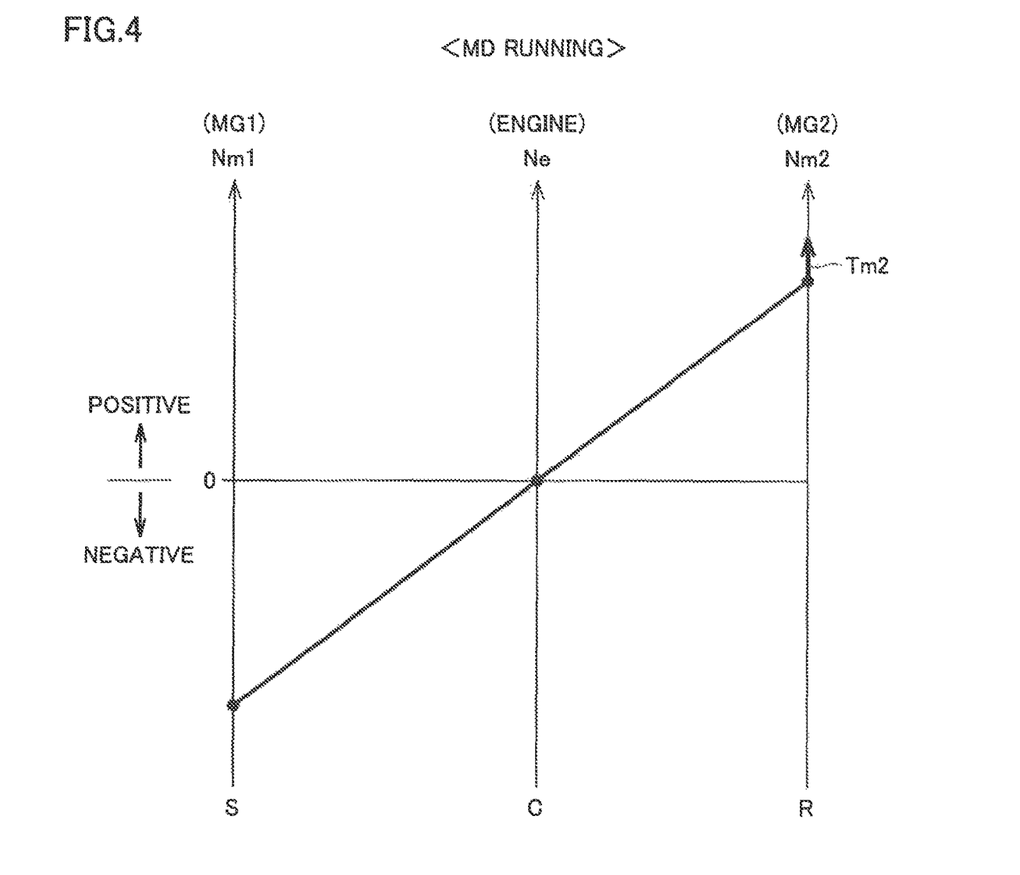
FIG. 4 is a view showing, on a nomographic chart, one example of a control state of an engine, a first MG, and a second MG during MD running.

FIG. 4 is a view showing, on a nomographic chart of planetary gear mechanism 30, one example of a state of engine 100, the first MG, and the second MG during the MD running. As described above, the rotation speed of sun gear S (=MG1 rotation speed Nm1), the rotation speed of carrier CA (=engine rotation speed Ne), and the rotation speed of ring gear R (=MG2 rotation speed Nm2) have such a relation that they are connected by a straight line on the pornographic chart (hereinafter also referred to as a "relation on the nomographic chart").

As shown in FIG. 4, during the MD running, fuel supply to engine 100 is stopped, and vehicle 1 is caused to run in the fail-safe mode by a torque Tm2 of the second MG. Thereby, engine rotation speed Ne becomes 0, and MG2 rotation speed Nm2 has a positive value. Although the first MG does not output a torque since first inverter 221 is in a gate shut-down state, the first MG is mechanically rotated in a negative direction as the second MG is rotated in a positive direction, based on the relation on the nomographic chart. Accordingly, MG1 rotation speed Nm1 has a negative value.

<Determination of Whether or Not Short-Circuit Fault Occurs in First Inverter>

In a case where an abnormality occurs in first inverter 221, it is effective to determine whether or not the abnormality is a short-circuit fault of any of switching elements Q3 to Q8, in order to decide what kind of fail-safe running is to be performed after the occurrence of the abnormality, and in order to reduce time and cost needed for part replacement.

However, as described above, first inverter 221 outputs the same fail signal (upper fail signal FU or lower fail signal FL) both when a short-circuit fault of any of switching elements Q3 to Q8 occurs and when an abnormality other than the short-circuit fault (such as an open fault, overcurrent, overvoltage, overheating, or the like) occurs. Accordingly, ECU 300 cannot determine, whether or not the abnormality occurring in first inverter 221 is a short-circuit fault, only by receiving a fail signal from first inverter 221.

One exemplary technique for determining whether or not a short-circuit fault occurs is a technique described in the section of Background Art, that is, a technique using the current of each phase (circulating current due to a counter-electromotive voltage of the first MG) with first inverter 221 being in a gate shut-down state.

Figure 5:
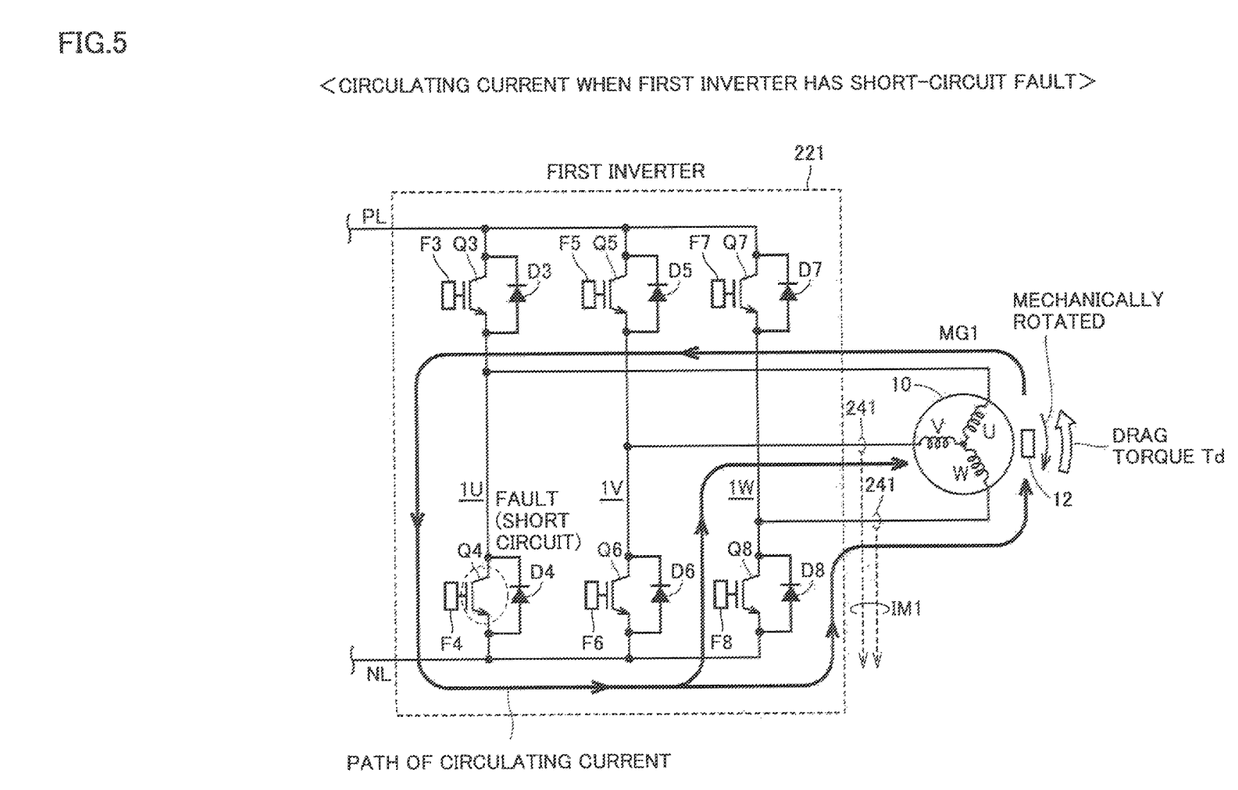
FIG. 5 is a view schematically showing a path of a circulating current.

FIG. 5 is a view schematically showing a path of a circulating current when one of switching elements Q3 to Q8 of first inverter 221 has a short-circuit fault. It should be noted that FIG. 5 shows an example in which lower arm Q4 of the U phase has a short-circuit fault during the MD running.

As described above, during the MD running, the first MG is mechanically rotated in the negative direction by a rotating force of the second MG. By rotating a permanent magnet 12 provided in the rotor of the first MG, a counter-electromotive voltage is generated in the first MG. Resulting from this counter-electromotive voltage, a circulating current (short-circuit current) is generated in a path as indicated by solid line arrows in FIG. 5. Specifically, since lower arm Q4 of the U phase having a short-circuit fault permits flow of a current from the first MG side toward the power line NL side, the current flows from the first MG toward lower arm Q4. Since lower diode D6 of the V phase and lower diode D8 of the W phase permit flow of a current from the power line NL side toward the first MG side, the current which has flowed through lower arm Q4 is returned to the first MG via diodes D6 and D8.

Thus, when one of switching elements Q3 to Q8 of first inverter 221 has a short-circuit fault, even if ECU 300 attempts to control first inverter 221 into a gate shut-down state, the first MG is mechanically rotated and thereby the circulating current flows. Therefore, when outputs of current sensors 241 (phase currents of the first MG) exceed a threshold value during the MD running (while first inverter 221 is in a gate shut-down state), it can be determined that any of switching elements Q3 to Q8 of first inverter 221 has a short-circuit fault.

However, when the circulating current flows as described above, a drag torque Td (braking torque) acting in a direction which prevents rotation of the first MG is generated in the first MG. If the absolute value of MG1 rotation speed Nm1 is reduced to near 0 due to this drag torque Td, the counter-electromotive voltage of the first MG is reduced, and the circulating current has a very low value. Accordingly, there is a possibility that the technique using the circulating current may fail to accurately determine whether or not first inverter 221 has a short-circuit fault.

Figure 6:
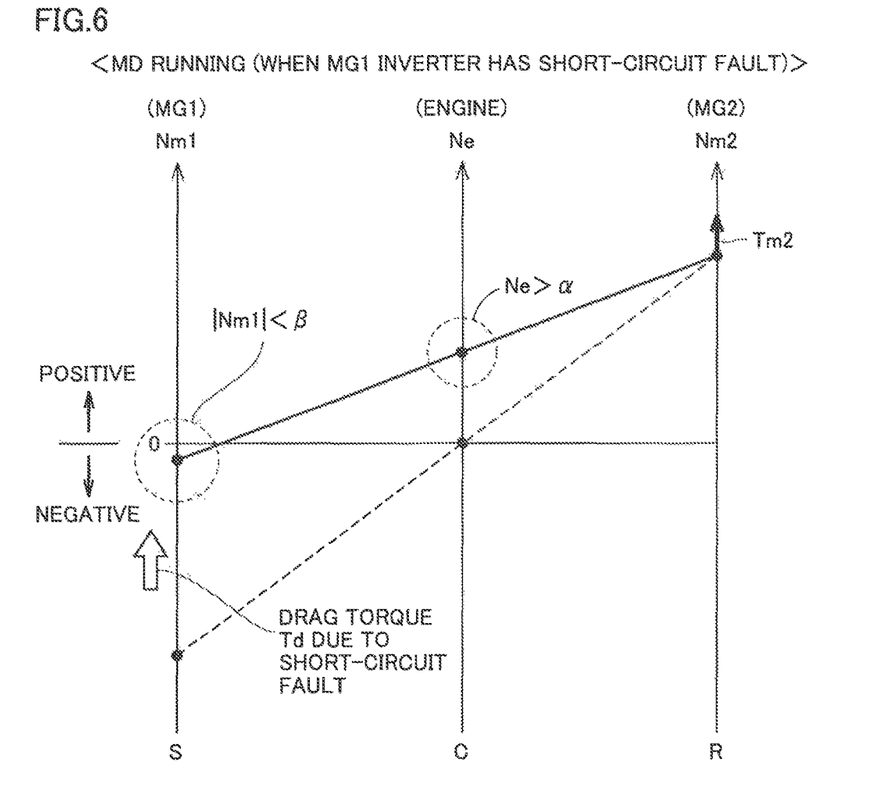
FIG. 6 is a view showing, on a nomographic chart, one example of a state of the engine, the first MG, and the second MG when a short-circuit fault occurs in the first inverter during the MD running.

FIG. 6 is a view showing, on a nomographic chart of planetary gear mechanism 30, one example of a state of engine 100, the first MG, and the second MG when a short-circuit fault occurs in first inverter 221 during the MD running. When no short-circuit fault occurs in first inverter 221, engine rotation speed Ne is 0, MG2 rotation speed Nm2 has a positive value, and MG1 rotation speed Nm1 has a negative value, as indicated by a broken line in FIG. 6.

However, when a short-circuit fault occurs in first inverter 221, the first MG generates drag torque Td resulting from the counter-electromotive voltage. Due to this drag torque Td, the absolute value of MG1 rotation speed Nm1 is reduced to near 0 and becomes less than a threshold value β, as indicated by a solid line in FIG. 6. Accordingly, engine rotation speed Ne is increased to be more than or equal to predetermined value α. In such a state, the counter-electromotive voltage of the first MG is reduced and the circulating current hardly flows, and thus it is not possible to accurately determine whether or not first inverter 221 has a short-circuit fault, using the circulating current.

Therefore, when ECU 300 in accordance with the present embodiment receives a fail signal from first inverter 221, ECU 300 determines whether or not first inverter 221 has a short-circuit fault based on whether or not engine 100 and the first MG are in the state as indicated by the solid line in FIG. 6, instead of being based on the presence or absence of the circulating current (outputs of current sensors 241).

Specifically, when ECU 300 receives a fail signal from first inverter 221 during the normal running, ECU 300 performs "shut-down control" which brings first inverter 221 into a gate shut-down state with fuel supply to engine 100 being stopped.

When the state as indicated by the solid line in FIG. 6 is obtained after the shut-down control is started, that is, when the absolute value of engine rotation speed Ne is more than or equal to predetermined value α and the absolute value of MG1 rotation speed Nm1 is less than threshold value β after the shut-down control is started, ECU 300 determines that first inverter 221 has a short-circuit fault (that is, a short-circuit fault occurs in any of switching elements Q3 to Q8).

On the other hand, when the state as indicated by the solid line in FIG. 6 is not obtained after the shut-down control is started, that is, when the absolute value of engine rotation speed Ne is less than predetermined value α or the absolute value of MG1 rotation speed Nm1 is more than or equal to threshold value β after the shut-down control is started, ECU 300 determines that first inverter 221 does not have a short-circuit fault (that is, no short-circuit fault occurs in switching elements Q3 to Q8).

Thereby, even when the absolute value of MG1 rotation speed Nm1 stagnates near 0 (less than threshold value and the circulating current hardly flows, it can be determined whether or not any of switching elements Q3 to Q8 of first inverter 221 has a short-circuit fault. In addition, by determining beforehand during running whether or not the abnormality of first inverter 221 is a short-circuit fault, time and cost needed for repair such as part replacement can be reduced.

Furthermore, ECU 300 in accordance with the present embodiment switches the mode of the fail-safe running, depending on whether or not the abnormality of first inverter 221 is a short-circuit fault. Specifically, ECU 300 performs the MD running when the abnormality of first inverter 221 is a short-circuit fault, and performs the MED running when the abnormality of first inverter 221 is not a short-circuit fault. By performing the MED running instead of the MD running when the abnormality of first inverter 221 is not a short-circuit fault as described above, the fail-safe running using not only the electric power of battery 150 but also the fuel of engine 100 can be performed. As a result, a fail-safe running distance can be increased.

Figure 7:
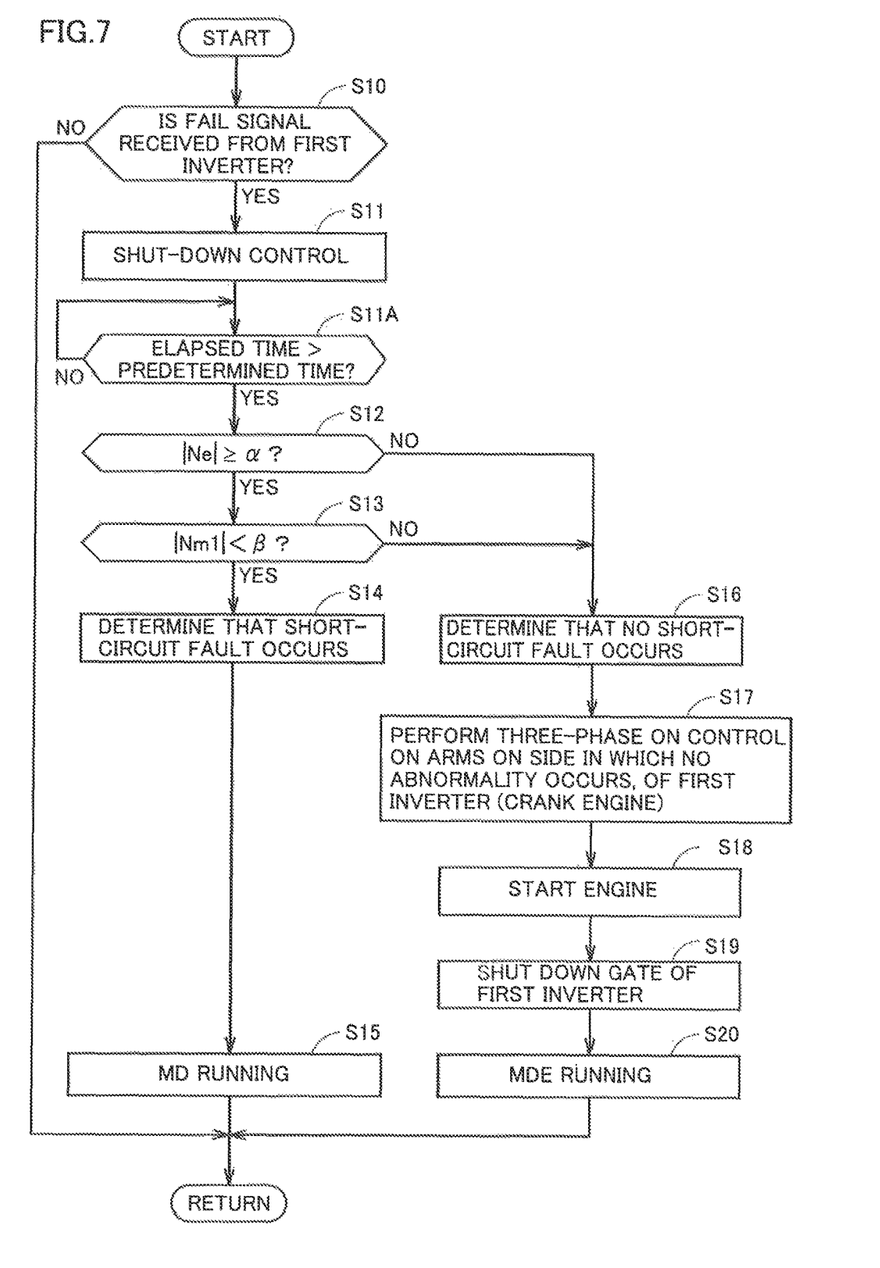
FIG. 7 is a flowchart showing a processing procedure by an ECU.

FIG. 7 is a flowchart showing a processing procedure by ECU 300. This flowchart is repeatedly performed at a predetermined cycle during the normal running (during the HV running or the EV running).

In step (hereinafter abbreviated as "S") 10, ECU 300 determines whether or not it receives a fail signal (upper fail signal FU or lower fail signal FL) from first inverter 221. When ECU 300 does not receive a fail signal (NO in S10), ECU 300 terminates the processing.

When ECU 300 receives a fail signal (YES in S10), ECU 300 performs the shut-down control described above in S11. That is, ECU 300 outputs to first inverter 221 a control signal for stopping fuel supply to engine 100 and bringing first inverter 221 into a gate shut-down state. It should be noted that, when the EV running is performed and fuel supply to engine 100 has already been stopped, ECU 300 continues stopping the fuel supply to engine 100.

After the shut-down control is started, ECU 300 determines in S11A whether or not an elapsed time after starting the shut-down control exceeds a predetermined time. When the elapsed time after starting the shut-down control does not exceed the predetermined time (NO in S11A), ECU 300 repeats the processing of S11A and waits until the elapsed time exceeds the predetermined time.

The processing of S11A is performed in order to eliminate a state where engine rotation speed Ne is more than or equal to predetermined value α under the influence of the HV running (fuel supply to engine 100) before the shut-down control is started, rather than under the influence of drag torque Td of the first MG after the shut-down control is started. That is, if the HV running is performed before the shut-down control is started, even when the fuel supply to engine 100 is stopped by the shut-down control, it takes some time for engine rotation speed Ne to be reduced to the state indicated by the solid line or the broken line in FIG. 6. Thus, ECU 300 waits until the elapsed time after starting the shut-down control exceeds the predetermined time (time assumed to be taken until engine rotation speed Ne is reduced to the state indicated by the solid line or the broken line in FIG. 6 after the fuel supply to engine 100 is stopped), and then performs processing in S12 and afterward.

When the elapsed time after starting the shut-down control exceeds the predetermined time (YES in S11A), ECU 300 determines in S12 and S13 whether or not the state as indicated by the solid line in FIG. 6 is obtained. Specifically, ECU 300 determines in S12 whether or not the absolute value of engine rotation speed Ne detected by engine rotation speed sensor 410 is more than or equal to predetermined value α, and determines in S13 whether or not the absolute value of MG1 rotation speed Nm1 detected by resolver 421 is less than threshold value β.

When the absolute value of engine rotation speed Ne is more than or equal to predetermined value a (YES in S12) and the absolute value of MG1 rotation speed Nm1 is less than threshold value β (YES in S13), that is, when the state as indicated by the solid line in FIG. 6 is obtained, ECU 300 determines in S14 that first inverter 221 has a short-circuit fault, and performs in S15 the fail-safe running implemented by the MD running.

On the other hand, when the absolute value of engine rotation speed Ne is less than predetermined value α (NO in S12) or the absolute value of MG1 rotation speed Nm1 is more than or equal to threshold value β (NO in S13), that is, when the state as indicated by the solid line in FIG. 6 is not obtained, ECU 300 determines in S16 that first inverter 221 does not have a short-circuit fault, and performs in S17 to S20 the fail-safe running implemented by the MDE running.

Specifically, first, in S17, ECU 300 performs three-phase ON control of first inverter 221 to crank engine 100. The three-phase ON control of first inverter 221 is control that brings upper arms Q3, Q5, and Q7 or lower arms Q4, Q6, and Q8 of the three phases of first inverter 221 into a conductive state.

When ECU 300 in accordance with the present embodiment performs the three-phase ON control of first inverter 221, ECU 300 brings arms on a side in which no abnormality occurs, of upper arms Q3, Q5, and Q7 and lower arms Q4, Q6, and Q8, into a conductive state. That is, when ECU 300 receives upper fail signal FU, ECU 300 brings lower arms Q4, Q6, and Q8 into a conductive state, and when ECU 300 receives lower fail signal FL, ECU 300 brings upper arms Q3, Q5, and Q7 into a conductive state.

Figure 8:
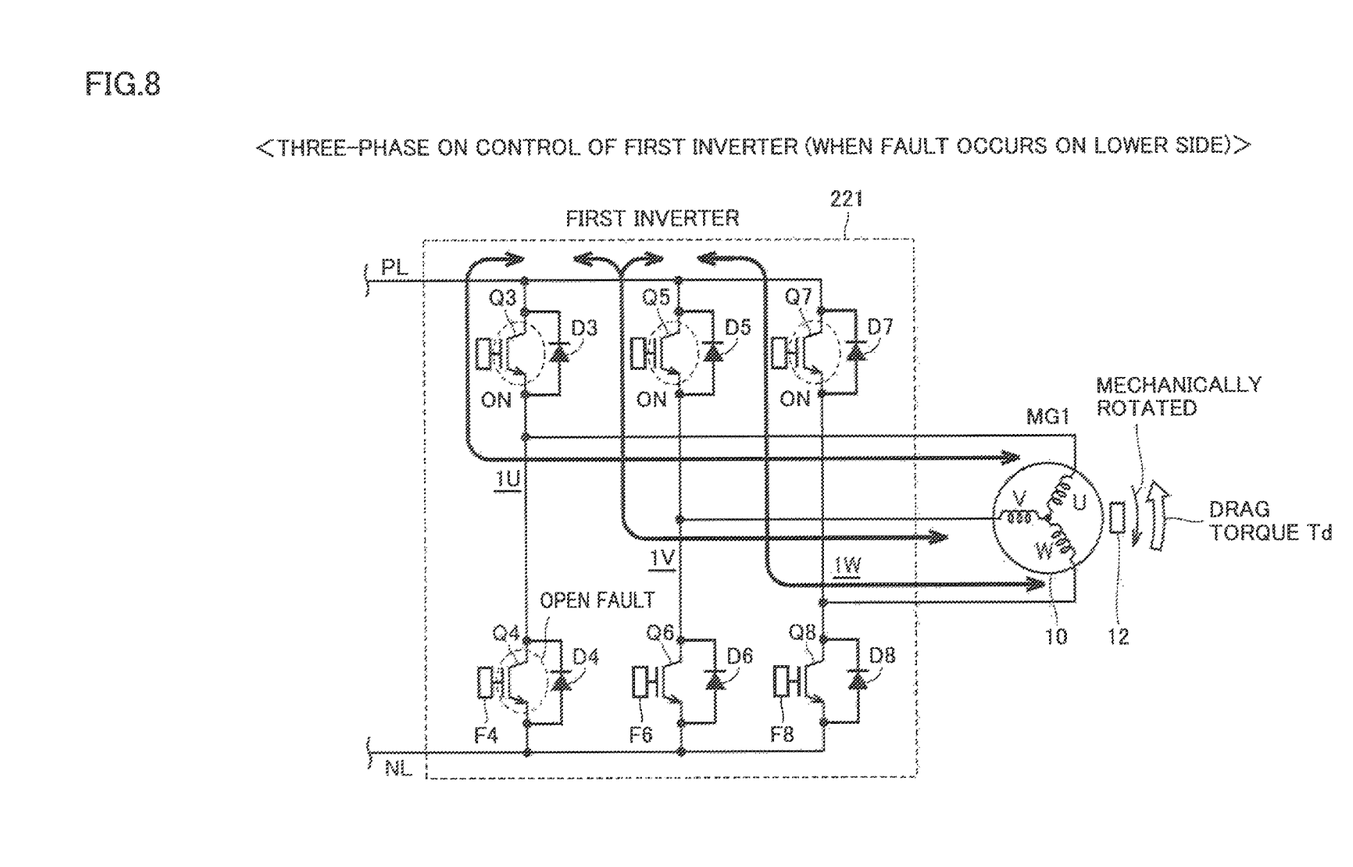
FIG. 8 is a view schematically showing a state during three-phase ON control.

FIG. 8 is a view schematically showing a state during the three-phase ON control when lower arm Q4 of the U phase of first inverter 221 has an open fault. When lower arm Q4 of the U phase has an open fault, first inverter 221 outputs lower fail signal FL to ECU 300.

When ECU 300 determines in S16 that no short-circuit fault occurs, ECU 300 performs in S17 the three-phase ON control. On this occasion, in a case where ECU 300 has received lower fail signal FL from first inverter 221, ECU 300 can recognize that an abnormality other than a short-circuit fault occurs in any of lower arms Q4, Q6, and Q8. The abnormality other than a short-circuit fault includes an open fault. Therefore, if the three-phase ON control is performed on lower arms Q4, Q6, and Q8, there is a possibility that any of lower arms Q4, Q6, and Q8 is not brought into a conductive state as instructed due to an open fault, and the three-phase ON control may not function normally.

Accordingly, when ECU 300 receives lower fail signal FL from first inverter 221, ECU 300 performs the three-phase ON control on upper arms Q3, Q5, and Q7 in which no abnormality occurs. Thereby, the three-phase ON control functions normally, and a current resulting from the counter-electromotive voltage of the first MG may flow through upper arms Q3, Q5, and Q7 in both directions as indicated by solid line arrows in FIG. 8. When the current flows, drag torque Td acting in the direction which prevents rotation of the first MG is generated in the first MG. Engine 100 is cranked by this drag torque Td. That is, even when lower arm Q4 has an open fault, drag torque Td can be generated in the first MG to reliably crank engine 100, by bringing upper arms Q3, Q5, and Q7 into a conductive state by the three-phase ON control.

Referring back to FIG. 7, when engine rotation speed Ne reaches the predetermined value by cranking of engine 100 by the three-phase ON control, ECU 300 starts fuel injection control and ignition control of engine 100 to start engine 100 in 818, and brings first inverter 221 into a gate shut-down state again in S19. Then, ECU 300 performs the fail-safe running implemented by the MDE running in S20. By performing the MDE running instead of the MD running when no short-circuit fault occurs as described above, the fail-safe running using not only the electric power of battery 150 but also the fuel of engine 100 can be performed, and thus the fail-safe running distance can be increased.

Figure 9:
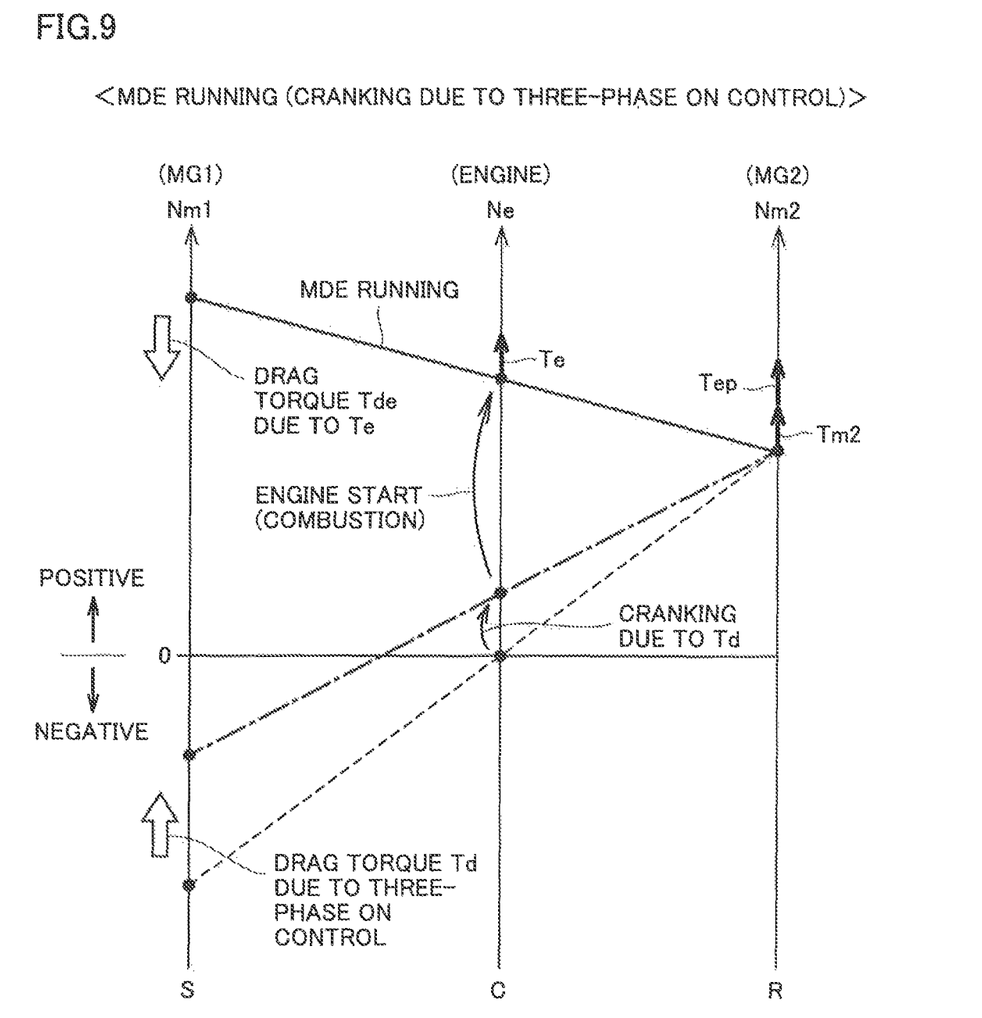
FIG. 9 is a view showing, on a nomographic chart, one example of a state of the engine, the first MG, and the second MG during MDE running.

FIG. 9 is a view showing, on a nomographic chart of planetary gear mechanism 30, one example of a state of engine 100, the first MG, and the second MG during the MDE running. When no short-circuit fault occurs in first inverter 221, after the shut-down control is started, engine rotation speed Ne is 0, MG2 rotation speed Nm2 has a positive value, and MG1 rotation speed Nm1 has a negative value, as indicated by a broken line in FIG. 9. From such a state, the engine is cranked by drag torque Td due to the three-phase ON control, and thereafter, an engine torque Te is generated by fuel ignition in engine 100.

Due to engine torque Te, the first MG is rotated in the positive direction as indicated by a solid line in FIG. 9. Thereby, the current resulting from the counter-electromotive voltage of the first MG circulates between the first MG and battery 150. As a result, the first MG generates a drag torque Tde acting in the direction which prevents rotation of the first MG (negative direction).

It should be noted that, if any of switching elements Q3 to Q8 of first inverter 221 has a short-circuit fault, there is a concern that the first MG is rotated by engine torque Te and thereby an excessive short-circuit current may intensively flow into the switching element having a short-circuit fault and cause a secondary fault. However, in the present embodiment, the MDE running is performed when it is determined that first inverter 221 does not have a short-circuit fault, and thus an excessive current due to a short-circuit fault does not flow and a secondary fault does not occur.

Since drag torque Tde due to engine torque Te acts on sun gear S from the first MG, an engine direct torque Tep acting in the positive direction (forward direction) is generated in ring gear R, as a reaction force to drag torque Tde. Thereby, in the MDE running, the fail-safe running can be performed using engine direct torque Tep in addition to torque Tm2 of the second MG. That is, the fail-safe running using not only the electric power of battery 150 but also the fuel of engine 100 can be performed. As a result, the fail-safe running distance can be increased.

As has been described above, when ECU 300 in accordance with the present embodiment receives a fail signal from first inverter 221, ECU 300 determines whether or not first inverter 221 has a short-circuit fault based on the state of engine 100 and the first MG, instead of being based on the presence or absence of the circulating current (outputs of current sensors 241). Thereby, even when the absolute value of MG1 rotation speed Nm1 stagnates near 0 and the circulating current hardly flows, it can be determined whether or not any of switching elements Q3 to Q8 of first inverter 221 has a short-circuit fault.

<Variation>

In the embodiment described above, it is determined in S12 and S13 of FIG. 7 whether or not the state as indicated by the solid line in FIG. 6 is obtained, using engine rotation speed Ne detected by engine rotation speed sensor 410 and MG1 rotation speed Nm1 detected by resolver 421. However, the technique for determining whether or not the state as indicated by the solid line in FIG. 6 is obtained is not limited thereto.

Namely, MG1 rotation speed Nm1, engine rotation speed Ne, and MG2 rotation speed Nm2 have the relation on the nomographic chart, that is, such a relation that when any two of the rotation speeds are determined, the rest is also determined.

Therefore, for example, engine rotation speed Ne used for the determination in S12 of FIG. 7 may be a value estimated from MG1 rotation speed Nm1 and MG2 rotation speed Nm2 detected by resolvers 421 and 422, respectively, using the relation on the nomographic chart, instead of the value detected by engine rotation speed sensor 410. Similarly, MG1 rotation speed Nm1 used for the determination in S13 of FIG. 7 may be a value estimated from engine rotation speed Ne and MG2 rotation speed Nm2 detected by engine rotation speed sensor 410 and resolver 422, respectively, using the relation on the nomographic chart, instead of the value detected by resolver 421.

Further, whether or not the state as indicated by the solid line in FIG. 6 is obtained may be determined using engine rotation speed Ne and MG2 rotation speed Nm2, instead of using engine rotation speed Ne and MG1 rotation speed Nm1. In this case, when MG2 rotation speed Nm2 is included in a predetermined range in which the absolute value of engine rotation speed Ne is more than or equal to predetermined value α and the absolute value of MG1 rotation speed Nm1 is less than threshold value β, it can be determined that the state as indicated by the solid line in FIG. 6 is obtained. Furthermore, whether or not the state as indicated by the solid line in FIG. 6 is obtained may be determined using MG1 rotation speed Nm1 and MG2 rotation speed Nm2. In this case, when MG2 rotation speed Nm2 is included in a range in which the absolute value of MG1 rotation speed Nm1 is less than threshold value β and the absolute value of engine rotation speed Ne is more than or equal to predetermined value α, it can be determined that the state as indicated by the solid line in FIG. 6 is obtained.

Although the embodiment of the present invention has been described, it should be understood that the embodiment disclosed herein is illustrative and non-restrictive in every respect. The scope of the present invention is defined by the scope of the claims, and is intended to include any modifications within the scope and meaning equivalent to the scope of the claims.

What is claimed is:

1. A hybrid vehicle, comprising:
an engine;
a first rotating electrical machine having a rotor provided with a permanent magnet;
an output shaft connected to drive wheels;
a planetary gear mechanism configured to mechanically couple the engine, the first rotating electrical machine, and the output shaft;
a second rotating electrical machine connected to the output shaft;
a power supply;
a first inverter having a plurality of switching elements, the first inverter being configured to convert electric power between the power supply and the first rotating electrical machine;
a second inverter configured to convert electric, power between the power supply and the second rotating electrical machine; and
a controller configured to control the engine, the first inverter, and the second inverter,
when the controller receives from the first inverter a fail signal indicating that the first inverter is abnormal, the controller being configured to perform shut-down control which brings the first inverter into a gate shut-down state with fuel supply to the engine being stopped,
when an absolute value of a rotation speed of the engine is more than or equal to a predetermined value and an absolute value of a rotation speed of the first rotating electrical machine is less than a threshold value after the shut-down control is started, the controller being configured to determine that a short-circuit fault occurs in any of the plurality of switching elements, and
when the absolute value of the rotation speed of the engine is less than the predetermined value or the absolute value of the rotation speed of the first rotating electrical machine is more than or equal to the threshold value after the shut-down control is started, the controller being configured to determine that no short-circuit fault occurs in the plurality of switching elements.

2. The hybrid vehicle according to claim 1, wherein
the plurality of switching elements are electrically connected between the power supply and the first rotating electrical machine to constitute drive arms of three phases each having an upper arm and a lower arm,
the controller is configured to perform (i) first fail-safe running control when the controller determines that the short-circuit fault occurs, and (ii) second fail-safe running control when the controller determines that no short-circuit fault occurs, the first fail-safe running control is control which causes the hybrid vehicle to run using motive power of the second rotating electrical machine without using motive power of the engine, and the second fail-safe running control is control which causes the engine to crank by performing three-phase ON control that brings the upper arms or the lower arms of the three phases of the first inverter into a conductive, state, causes the engine to start by cranking, and thereafter brings the first inverter into the gate shutdown state and causes the hybrid vehicle to run using the motive power of the engine and the motive power of the second rotating electrical machine.

3. The hybrid vehicle according to claim 2, wherein the first inverter is configured to output the fail signal to the controller in such a manner that whether at least one of the upper arms of the three phases or at least one of the lower arms of the three phases is abnormal can be identified, and when the controller performs the three-phase ON control, the controller is configured to bring arms without abnormality, of the upper arms and the lower arms, into the conductive state.

* * * * *